(12) United States Patent
Okamoto

(10) Patent No.: US 8,755,092 B2
(45) Date of Patent: Jun. 17, 2014

(54) IMAGE READING APPARATUS ILLUMINATING A DOCUMENT WITH POINT LIGHT SOURCE AND IMAGE FORMING APPARATUS

(75) Inventor: Katsuhiko Okamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 618 days.

(21) Appl. No.: 13/049,648

(22) Filed: Mar. 16, 2011

(65) Prior Publication Data

US 2011/0228353 A1 Sep. 22, 2011

(30) Foreign Application Priority Data

Mar. 18, 2010 (JP) ................................. 2010-062184

(51) Int. Cl.
*H04N 1/04* (2006.01)
(52) U.S. Cl.
USPC ........... 358/475; 358/474; 358/501; 358/509; 358/505; 347/152; 347/242; 347/245; 347/257; 347/263; 399/122; 399/13; 399/144; 362/610; 362/551
(58) Field of Classification Search
CPC .......... H04N 2201/02431; H04N 2201/02458; H04N 2201/02435; H04N 2201/02462; H04N 2201/02468; H04N 1/02815; H04N 1/02855; H04N 1/02865
USPC .......... 358/474, 475, 501, 509, 505; 347/152, 347/242, 245, 257, 263; 399/144, 122, 13; 362/610, 551
See application file for complete search history.

(56) References Cited

U.S. PATENT DOCUMENTS

| 8,325,392 | B2* | 12/2012 | Tagawa et al. | ................ 358/475 |
| 2006/0008295 | A1* | 1/2006 | Kohchi et al. | ................ 399/144 |
| 2010/0129116 | A1* | 5/2010 | Shinkawa | ..................... 399/200 |
| 2010/0232834 | A1* | 9/2010 | Ishida | .......................... 399/144 |

FOREIGN PATENT DOCUMENTS

| JP | 2006-025303 | 1/2006 |
| JP | 2008-35036 A | 2/2008 |
| JP | 2009-295552 A | 12/2009 |

OTHER PUBLICATIONS

Notice of Reasons for Rejection issued on May 22, 2012 to Japanese Application No. 2010-062184.

* cited by examiner

*Primary Examiner* — Benny Q Tieu
*Assistant Examiner* — Quyen V Ngo
(74) *Attorney, Agent, or Firm* — Knobbe Martens Olson & Bear LLP

(57) ABSTRACT

An image reading apparatus includes an array substrate in which a plurality of point light sources is mounted along the main scanning direction, a light guide member disposed on a surface of the array substrate that mounts the plurality of point light sources, and guiding light from the plurality of point light sources to the document surface, a frame for fixing the light guide member and the array substrate, a positioning unit that determines the positional relationship of the frame with the light guide member and the array substrate in a configuration in which the incident surface of the light guide member is in proximity to or in contact with the plurality of point light sources; and an image reading unit that uses reflected light when illuminating light from the plurality of point light sources through the light guide member onto the document surface to thereby read the document image.

10 Claims, 4 Drawing Sheets

IMAGE READING APPARATUS ILLUMINATING A DOCUMENT WITH POINT LIGHT SOURCE AND IMAGE FORMING APPARATUS

This application is based on and claims the benefit of priority from Japanese Patent Application No. 2010-062184, filed on 18 Mar. 2010, the content of which is incorporated herein by reference.

BACKGROUND OF THE INVENTION

1. Field of the Invention

The present invention relates to an image reading apparatus such as a scanner or the like that illuminates a document using a plurality of point light sources arrayed at a predetermined interval to thereby read a document image, and to an image forming apparatus such as a copying machine, facsimile, multifunction peripheral, and the like provided with this type of image reading apparatus.

2. Related Art

Conventionally, an image reading apparatus for reading image information from a document, such as scanner, is known that illuminates light from an illumination means onto the document, images reflected light from the document, and converts the resulting image information into a digital electrical signal using a photoelectric conversion means such as a CCD image sensor, or the like.

In this type of image reading device, a general purpose xenon lamp or a cold cathode tube, or the like is known as an illumination means that illuminates light onto the document.

In recent years, in substitution for the above, a plurality of low cost, durable, and high luminance point light sources such as a LED (light-emitting diode) is arrayed at a predetermined interval along a main scanning direction (for example, a LED array substrate) as an illumination means.

In an image reading apparatus that uses an illumination means that arrays a plurality of point light sources (LED) such as an LED array substrate, a light guide member formed from a translucent resin, glass, or the like is disposed for example between a plurality of LEDs and a document to guide light emitted from the LEDs onto the document surface. This light guide member suppresses a non-uniform distribution in illumination on the document surface by guiding light that is emitted from the LED and dispersed into a conical shape along the main scanning direction to thereby illuminate the document.

However, when there is a deviation in the positional relationship between the light guide member and the plurality of LEDs, it is sometimes the case that light cannot be uniformly illuminated with respect to the main scanning direction of the document.

In other words, since light emitted from the LEDs is dispersed in a conical shape, the incident surface of the light guide member and the LED array is not parallel. As a result, when for example the interval between the incident surface of the light guide member and the LEDs is different on both ends in the main scanning direction, the light amount of light that is incident upon the light guide member is high in portions in which the interval is small, and the light amount is low in portions in which the interval is large. Consequently, a dotted pattern may be produced.

Furthermore, even when the incident surface of the light guide member is parallel to the LED array, if the interval between the LEDs and the incident surface of the light guide member is excessively large, the light amount of light that is emitted from the LEDs and becomes incident upon the light guide member is reduced, and therefore, may result in insufficient luminance on the document surface.

As a result, an image forming apparatus is provided in which the light guide member protrudes towards the plurality of LEDs arrayed in a linear configuration, and thereby determines the positional relationship between the LEDs and the light guide member, and uses a fixing member such as a screw or the like to fix the respective components in a fixed positional state.

However, in this image reading apparatus, when the light guide member is pressed onto the LEDs during assembly operations, it may be the case that a deviation is caused in the positional relationship between the light guide member and the LEDs due to a frictional force produced when fixing with a fixing member such as a screw or the like.

For this reason, an operator must secure and fix these components in a state in which the light guide member is pressed onto the plurality of LEDs.

Therefore, a pressing force is applied during assembly operations to the plurality of LEDs, and even after securing, a state is maintained in which a pressing force is applied.

As a result, during assembly operations, it may be the case that the LEDs are damaged, or that mounting detachment is produced in which the LEDs are detached from the LED array substrate. Furthermore, since a pressing force is applied to the LEDs even after assembly operations, it may be the case that damage to the LEDs or detaching of the mounting will result from slight impacts such as a vibration during use or during transporting.

SUMMARY OF THE INVENTION

The present invention has the object of providing an image reading apparatus including an array substrate that mounts a plurality of point light sources, a light guide member, and a frame, and in which a positioning unit is provided for positioning of the array substrate, the light guide member and the frame.

The present invention has the object of providing an image forming apparatus provided with the image reading apparatus.

The present invention relates to an image reading apparatus including an array substrate in which a plurality of point light sources is arrayed and mounted in a linear shape at a predetermined interval along the main scanning direction, a light guide member disposed on a surface of the array substrate that mounts the plurality of point light sources, and guiding light from the plurality of point light sources to the document surface, a frame for fixing the light guide member and the array substrate, a positioning unit that determines the positional relationship of the frame with the light guide member and the array substrate in a state in which the incident surface of the light guide member is in proximity or in contact with the plurality of point light sources, and an image reading unit that uses reflected light when illuminating light from the plurality of point light sources through the light guide member onto the document surface to thereby read the document image.

The present invention relates to an image forming apparatus including an image reading apparatus, the image reading apparatus including an array substrate in which a plurality of point light sources is arrayed and mounted in a linear shape at a predetermined interval along the main scanning direction, a light guide member disposed on a surface of the array substrate that mounts the plurality of point light sources, and guiding light from the plurality of point light sources to the document surface, a frame for fixing the light guide member and the array substrate, a positioning unit that determines the positional relationship of the frame with the light guide member and the array substrate in a state in which the incident surface of the light guide member is in proximity or in contact with the plurality of point light sources, and an image reading unit that uses reflected light when illuminating light from the plurality of point light sources through the light guide member onto the document surface to thereby read the document image.

DETAILED DESCRIPTION OF THE INVENTION

The aspects of the embodiments of the present invention will be described to enable comprehension of the present invention while making reference to the attached figures. The aspects of the embodiment illustrate an actual example of the present invention, and do not limit the technical scope of the present invention.

Figure 1:
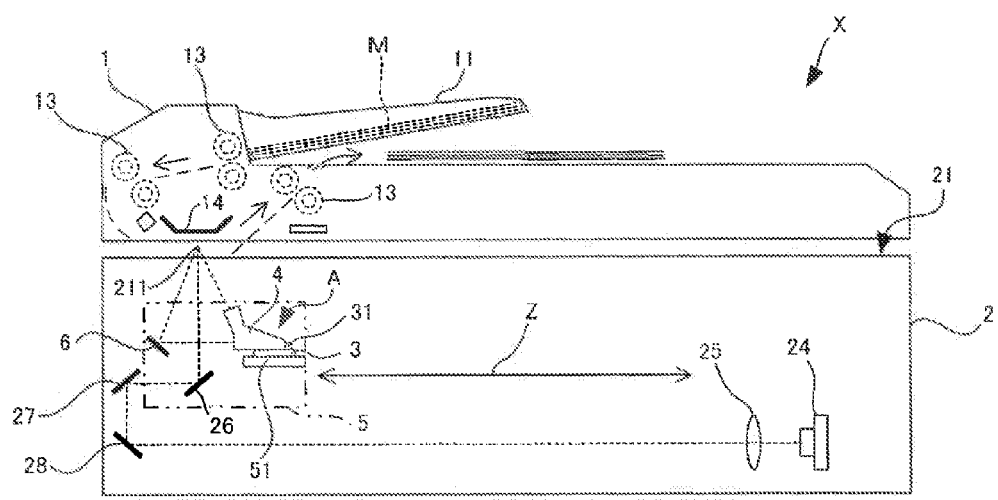
FIG. 1 is a schematic figure showing the schematic configuration of an image reading apparatus according to the present invention.

Firstly, the schematic features of the image reading apparatus according to the present invention will be described using FIG. 1. FIG. 1 is a schematic view showing the schematic configuration of a scanner X. FIG. 1 is a schematic view showing a front view of the internal structure of the scanner X.

The present invention relates to an image reading apparatus such as the scanner X, and to an image forming apparatus such as a copying machine, facsimile, multifunction peripheral and the like provided with the image reading apparatus such as the scanner X. However in the present embodiment, the scanner X provided with an automatic document feed apparatus (ADF) 1 such as illustrated in FIG. 1 will be described as an example thereof.

The scanner X according to the present embodiment includes an apparatus main body 2 and the ADF 1 that is an automatic document feed apparatus disposed on the apparatus main body 2.

The ADF 1 conveys at least one document M set in a document setting unit 11 in sequence from a plurality of conveyance roller pairs 13 driven by a document feed motor (not shown). The document M is displaced and passes through the document reading position 211 on the contact glass 21 in a subscanning direction. A copy holder 14 for pressing the displacing document M is opposed in proximity to the contact glass in an inner portion of the ADF 1 at a position corresponding to the document reading position 211.

A contact glass 21 functions as a document mounting plate and is provided on an upper surface of the apparatus main body 2. An operational unit (not shown) that includes operation keys such as a keyboard or a display portion (not shown) such as a liquid crystal display is provided on the side surface on the front surface side of the apparatus main body 2.

An inner portion of the apparatus main body 2 includes a light source unit 5 (an example of a frame) that can travel on a subscanning direction shown by the arrow Z driven by a drive motor (not shown), and is provided with an array substrate 3 mounting a plurality of LEDs 31 (light emitting diodes, an example of a point light source), and a light guide member 4 that guides light from the plurality of LEDs 31, a CCD image sensor 24 (image reading unit) producing an image signal corresponding to the incident received light amount, and a mirror 26-28 illuminated from the plurality of LEDs and guiding reflected light reflected by the document M through the optical lens 25 to the CCD image sensor 24.

A control unit (not shown) is provided in an inner portion of the apparatus main body 2 to execute overall control of each unit.

The plurality of LEDs 31, the array substrate 3, and the light guide member 4 will be described below.

In the present embodiment, the transverse direction (direction shown by the arrow Z) in FIG. 1 denotes the subscanning direction in the absence of particular description to the contrary. The main scanning direction denotes the direction that is orthogonal to the surface of the page in FIG. 1 (the same applies in the following description).

The operation of the scanner X will be simply described hereafter.

The reading operation for image information by the scanner X is described below and does not exhibit particular differences from a conventional image reading apparatus.

Firstly, the scanner X conveys a document M in the subscanning direction with the ADF 1 with respect to an optical source unit 5 fixed to a position enabling illumination of light onto the document reading position 211. Alternatively, the light source unit 5 is displaced (moved) in the subscanning direction by the drive motor (not shown) with respect to the document M disposed on the contact glass 21.

Then, the scanner X illuminates light onto the document M from a plurality of LEDs 31 through the light guiding member 4.

In other words, the ADF 1 or the drive motor (not shown) functions as a scanning drive means, and the light source unit 5 is driven relative to the subscanning direction of the document M with respect to the document M, and light is illuminated and scanned from the plurality of LEDs through the light guide member 4 to the document M.

Then, reflected light from the document M is guided to the CCD image sensor 24 by the mirrors 26-28 and the optical lens 25, and a digital image signal is produced and read by the CCD image sensor 24.

The production of the digital image signal by the CCD image sensor 24 and the processing of the produced digital image signal do not exhibit any particular difference from a conventional image reading apparatus, and since such aspects do not have a direct relationship with the present invention, such description will be omitted.

The array substrate 3, the light guide member 4, and the mounting structure therefor will be described with reference to FIG. 2 to FIG. 4.

Figure 2A:
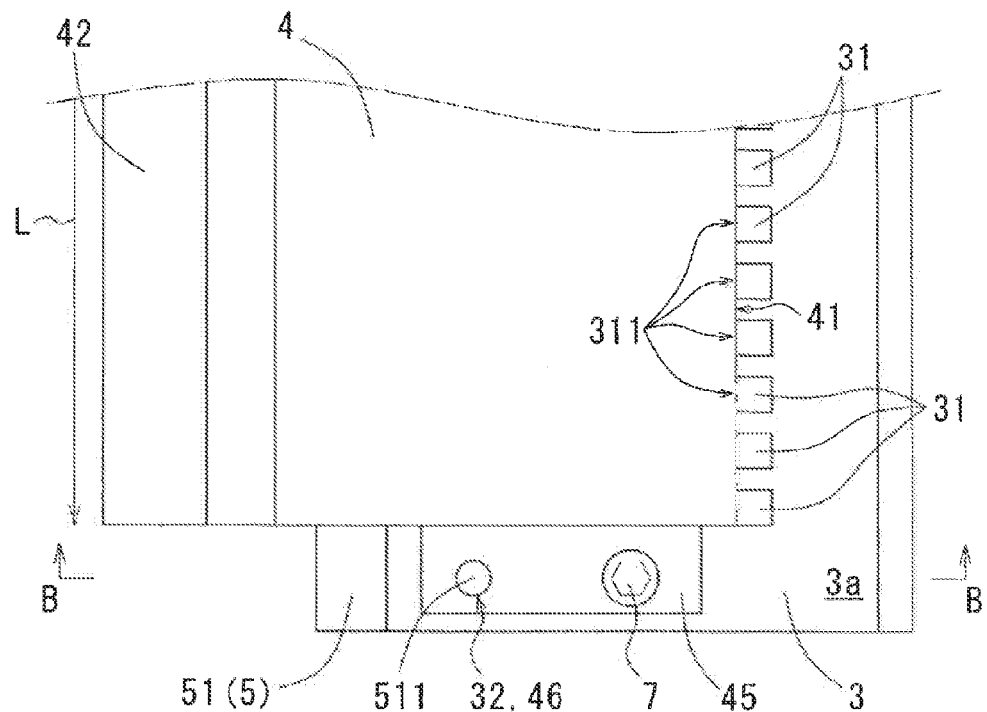
FIG. 2A is a plan view describing portion A in FIG. 1.
Figure 2B:
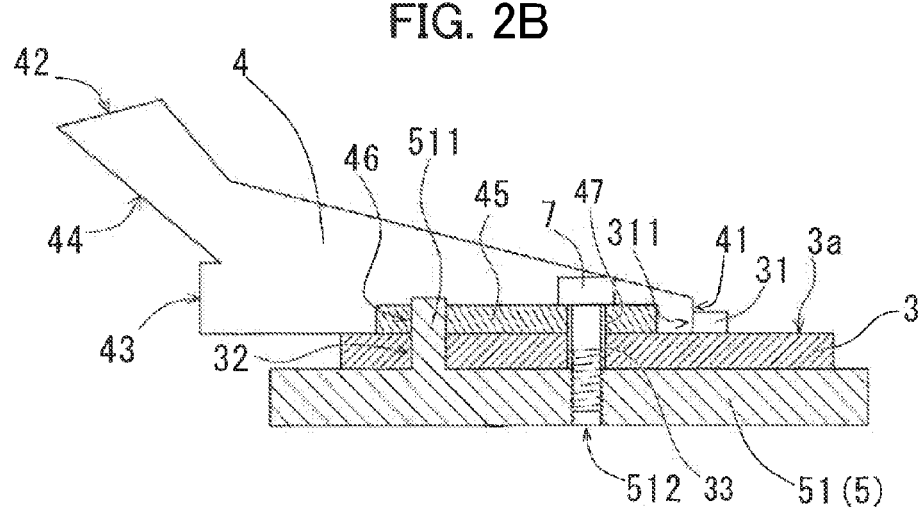
FIG. 2B is a sectional view along the line B-B in FIG. 2A.

FIG. 2A is a plan view describing portion A in FIG. 1. FIG. 2B is a sectional view along the line B-B in FIG. 2A. FIG. 3 is a perspective view showing a light guide member for the image reading apparatus according to the present invention. FIG. 4 is a perspective view showing an array substrate for the image reading apparatus according to the present invention.

Figure 3:
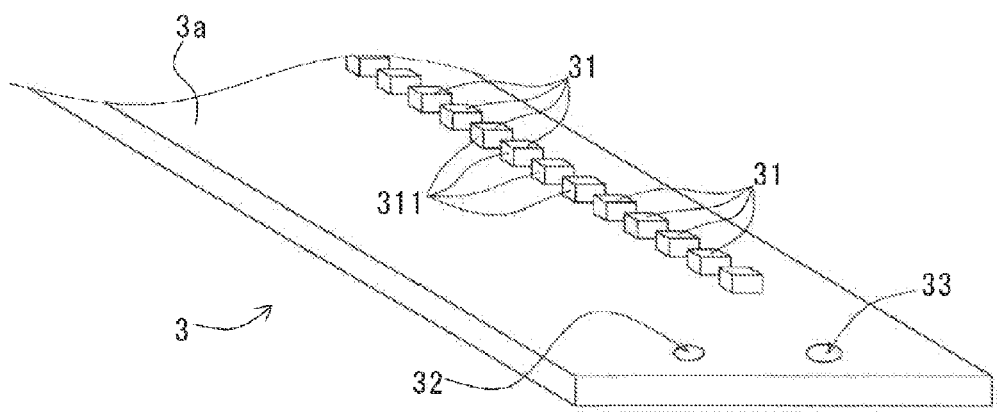
FIG. 3 is a perspective view showing a light guide member for the image reading apparatus according to the present invention.

As shown in FIG. 2A and FIG. 3, the plurality of LEDs 31 is arrayed and mounted in a linear shape at a predetermined interval along the main scanning direction on one surface (upper surface 3a) of the array substrate 3 that is configured a dimension of length in the main scanning direction. The plurality of LEDs 31 is integrated with the array substrate 3.

The light emitting surface 311 of the plurality of LEDs 31 that emits light for illuminating the document M is disposed along the same direction that is perpendicular on the array substrate 3 (the left side in FIG. 1, FIG. 2A, and FIG. 2B). The light emitting surface 311 is disposed along the same surface along the main scanning direction. There is not particular limitation on the method of mounting the plurality of LEDs 31 on the array substrate 3, and for example, such method may be exemplified by adhesion or welding.

The array substrate 3 is a printed substrate forming a pattern circuit for illuminating the plurality of the LEDs 31 by control from the control portion (not shown).

The light guide member 4 is a transparent member configured with a dimension of length in a main scanning direction.

Figure 4:
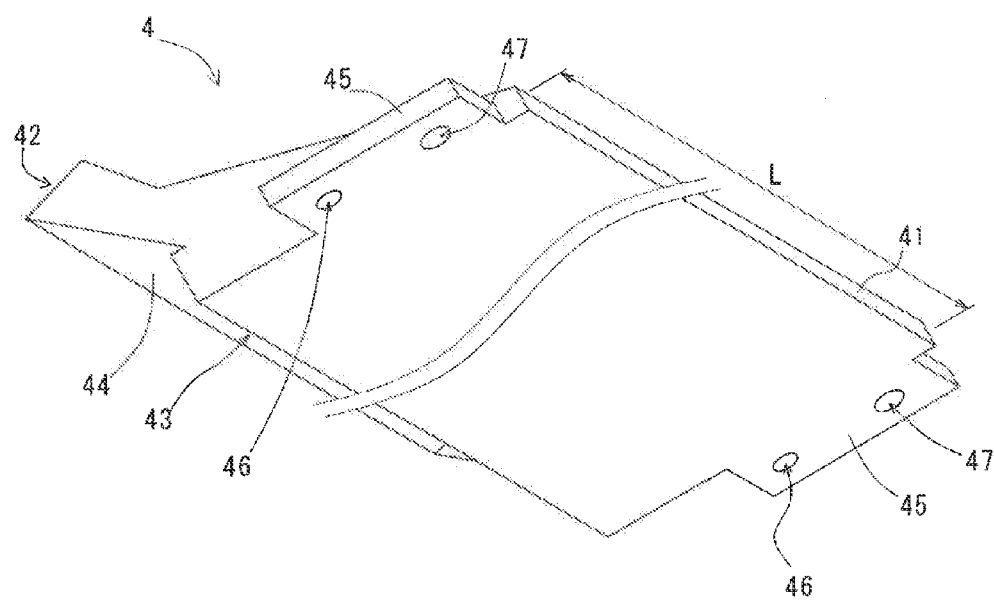
FIG. 4 is a perspective view showing an array substrate for the image reading apparatus according to the present invention.

As shown in FIG. 2A, FIG. 2B, and FIG. 4, the light guide member 4 includes an incident surface 41 formed on one end of the subscanning direction and on which light emitted from the plurality of LEDs becomes incident, a first emission surface 42 and a second emission surface 43 formed on the other end in the subscanning direction and emitting light that is incident from the incident surface 41 for illumination on the document M, and a reflection surface 44 reflecting light incident from the incident surface 41 in an inner portion of the light guide member 4 and guiding the light to the first emission surface 42. Herein, glass or a transparent resin or the like is used as the transparent member.

As shown in FIG. 2B, the incident surface 41 and the second emission surface 43 are formed in parallel.

The first emission surface 42 is positioned on the distant end so that the distance from the incident surface 41 is longer than the distance from the second emission surface 43, and is formed with a predetermined angle with respect to the incident surface 41.

The reflection surface 44 is formed between the first emission surface 42 and the second emission surface 43 to connect the first emission surface 42 and the second emission surface 43. The light guide member 4 is disposed on the surface of the array substrate 3 on which the plurality of LEDs 31 is mounted, that is to say, on the upper surface 3a.

The light guide member 4 is disposed so that the incident surface 41 faces the light emission surface 311 of the plurality of LEDs 31, and the first emission surface 42 faces the contact glass 21 (refer to FIG. 1).

A part of the light emitted from the plurality of LEDs 31 becomes incident from the incident surface 41 into the light guide member 4, and is then reflected by the reflection surface 44. Thereafter, the light is emitted from the first emission surface 42 and illuminated upon the document M mounted on the contact glass 21 (or passes through document reading position 211). The other part of the light is emitted from the second emission surface 43, reflected by a reflection plate 6 (refer to FIG. 1) to thereby illuminate the document M.

The light guide member 4 prevents production of a shadow when an image of a book document or a document that has a certain thickness is read by illuminating the document surface from two directions with light emitted from the first emission surface 42 and light emitted from the second emission surface 43 and reflected by the reflection plate 6.

The light guide member 4 may guide light emitted from the plurality of LEDs 31 with an expansion in the main scanning direction to a document surface. There is no limitation such that two emission surfaces should be provided as in the present embodiment, and one or three or more emission surfaces may be provided.

The array substrate 3 and the light guide member 4 configure the light emitting surface 311 of the plurality of LEDs 31 and the incident surface 41 of the light guide member 4 in a parallel orientation that is in contact (or in proximity), and are fixed to a frame 51 that configures the light source unit 5 (an example of the frame).

The parallel configuration of the light emitting surface 311 and the incident surface 41 enables a uniform luminance distribution on the document surface in the optical path region L with respect to the main scanning direction of the light guide member 4. Since the light emitting surface 311 makes contact with the incident surface 41, the document surface is illuminated without loss of a light amount due to emission from the light emitting surface 411 and therefore insufficient illumination of the document surface can be avoided.

The frame 51 forms a portion of the light source unit 5, by integrally being formed with the housing of the light source unit 5, or by fixing or the like by welding or a screw fixing means or the like.

In FIG. 2B, although the frame 51 is a plate shape member, there is no particular limitation in this regard.

The array substrate 3 and the frame 51 as shown in FIG. 2A are elongated more with respect to the main scanning direction than the optical path region L of the main scanning direction of the light guide member 4, and are formed to protrude outwardly from the optical path region L.

As shown in FIG. 2A and FIG. 4A, a positioning and fixing portion 45 is formed in the light guide member 4 to protrude outwardly to an outer side of the optical path region L in the main scanning direction.

The scanner X includes a positioning unit that determines the positional relationship with the frame 51 that configures the light guide member 4, the array substrate 3 and the light source unit 5 (an example of the frame) in a state in which the incident surface 41 of the light guide member 4 is in proximity to or in contact with the plurality of LEDs 31.

In the present embodiment, the positioning unit includes a first positioning hole 32 formed in the array substrate 3, a second positioning hole 46 formed in the light guide member 4, and a first positioning pin 511 provided in the frame 51, and inserted and fitted into both the first positioning hole 32 and the second positioning hole 46.

The first positioning hole 32 is formed in a portion formed to protrude more towards an outer side of the array substrate 3 than the optical path region L. The second positioning hole 46 that coincides with the first positioning hole 32 is formed in the positioning and fixing portion 45 integrated with the light guide member 4 in a state in which incident surface 41 of the light guide member 4 is in contact with the light emitting surface 31 of the plurality of LEDs 31.

The first positioning pin 511 that is fitted into both the first positioning hole 32 and the second positioning hole 46 is integrally formed with the frame 51 to protrude from the upper surface of the frame 51 in a portion which protrudes more to an outer side of the frame 51 than the optical path region L.

FIG. 2A, FIG. 2B and FIG. 3 shows only one of the two ends of the main scanning direction of the frame 51 and the array substrate 3, and the other end is omitted. However in the same manner as the second positioning hole 46 shown in FIG. 4, the first positioning hole 32 and the first positioning pin 511 are also formed on both respective end portions of the array substrate 3 and the frame 51 in the main scanning direction.

Operational personnel determined the position of the array substrate 3 and the light guide member 4 with reference to the frame 51 (light source unit 5) by fitting the first positioning hole 32, formed on the array substrate 3 and the second positioning hole 46 formed on the light guide member 4 in sequence into the first positioning pin 511 that is integrated with the frame 51.

In this manner, even when the plurality of LEDs 31 and the incident surface 41 of the light guide member 4 are in contact, the plurality of LEDs 31 are not pressed by the light guide member 4 during assembly operations, a pressing force is not applied to the plurality of LEDs 31. Therefore, positioning is facilitated with respect to the frame 51 (light source unit 5). Since a pressing force is not applied to the plurality of LEDs 31 even after the assembly operation, detaching of the mounting due to vibration during transportation or during use, or damage to the LED 31 itself can be prevented.

The first positioning hole 32, the second positioning hole 46 and the first positioning pin 511 are formed in a round configuration in the present embodiment when viewed in plan. However there is no limitation in this regard, and for example, formation in a polygon configuration in plan view is also possible. In this configuration, when formed only on one end portion in the main scanning direction, the frame 51 can be positioned with the array substrate 3 and the light guide member 4.

The first positioning pin 511 may be integrally formed on the frame 51 in the present embodiment. However there is no limitation in this regard, and mounting by positioning another member is possible.

In the present embodiment, when the incident surface 41 of the light guide member 4 is in contact with the light emitting surface 311 of the plurality of LED 31, the array substrate 3 and the light guide member 4 are positioned on the frame 51. However, the array substrate 3 and the light guide member 4 may be positioned on the frame 51 with the light emitting surface 311 and the incident surface 41 in a state of proximity by fitting the first positioning hole 32 and the second positioning hole 46 in sequence onto the first positioning pin 511 that is integrated with the frame 51.

In other words, as long as the illumination of the document surface is not insufficient, a space may be provided between the incident surface 41 and the light emitting surface 311.

In comparison to a state of contact, although the light amount that can be illuminated on the document surface is low, since there is a clearance between the incident surface 41 and the light emitting surface 311, there is the advantage that fitting of the first positioning pin during assembly processes is facilitated.

The array substrate 3 and the light guide member 4 are positioned with respect to the frame 51 with the incident surface 41 of the light guide member 4 in contact with the light emitting surface 311 of the plurality of LEDs 31 by the first positioning hole 32, the second positioning hole 46 and the first positioning pin 511 as described above. The array substrate 3 and the light guide member 4 are jointly attached by a fixing member such as a bolt 7 (configuring a fixing portion), and fixed to the frame 51.

The array substrate 3 and the light guide member 4 are fixed to the frame 51 by passing the bolt 7 through a through hole 47 formed in the positioning and fixing portion 45 that is integrated with the light guide member 4, and the through hole 33 formed in a portion that is formed to protrude more towards the outer side of the array substrate 3 than the optical path region L (refer to FIG. 3). In addition, the bolt 7 is threadably attached to a tap hole 512 (configuring the fixation) formed in a portion formed to protrude more towards an outer side of the frame 51 than the optical path region L. In this manner, after fixing the array substrate 3 and the light guide member 4 on one occasion, the number of components, and the number of operations is reduced in comparison to fixing to the frame 51.

The fixing member for fixing the array substrate 3 and the light guide member 4 to the frame 51 is not limited to a fixing member such as the bolt 7, and for example, a clamp or the like may be used to fix the array substrate 3, the light guide member 4 and the frame 51 to thereby enable sandwiching from above the light guide member 4 and from below the frame 51 as shown in FIG. 2B.

According to the present embodiment, the scanner X enables determination of the positional relationship between the light guide member 4 and the array substrate 3 in a state in which the plurality of LEDs 53 and the incident surface 41 of the light guide member 4 are in proximity, or in contact. In this manner, the scanner X can suppress the application of a load to the plurality of LEDs 53 due to pressing of the light guide member 4 onto the plurality of LEDs 53 during assembly, and therefore can prevent detaching of the mounting or damage to the light source itself during the assembly operation, or during transportation or use after assembly. Furthermore the scanner X illuminates light that is emitted from the plurality of LEDs 53 uniformly in the main scanning direction of the document and thereby avoids insufficient illumination.

According to the present embodiment, the scanner X can execute positioning by fitting of the first positioning hole 32 and the second positioning hole 46 formed on the light guide member 4 and the array substrate 3 onto the first positioning pin 511 that is provided on the frame 51 that fixes the light guide member 4 and the array substrate 3. In this manner, the scanner X is configured to facilitate assembly operations.

According to the present embodiment, further fixation of the light guide member 4 and the array substrate 3 in a positioned configuration by a positioning portion is enabled by use of a fixing portion (bolt 7, tap hole 512). In this manner, it is possible to respectively fix the light guide member 4 and the array substrate 3, and the array substrate 3 and the frame 51 without use of individual fixing members used for fixing operations. In this manner, the scanner X can reduce the number of components.

The present invention may be configured as an image forming apparatus provided with an image reading apparatus having the above configuration.

In other words, the same effect as that described above is obtained by an image forming apparatus provided with the scanner X according to the first embodiment.

Figure 5:
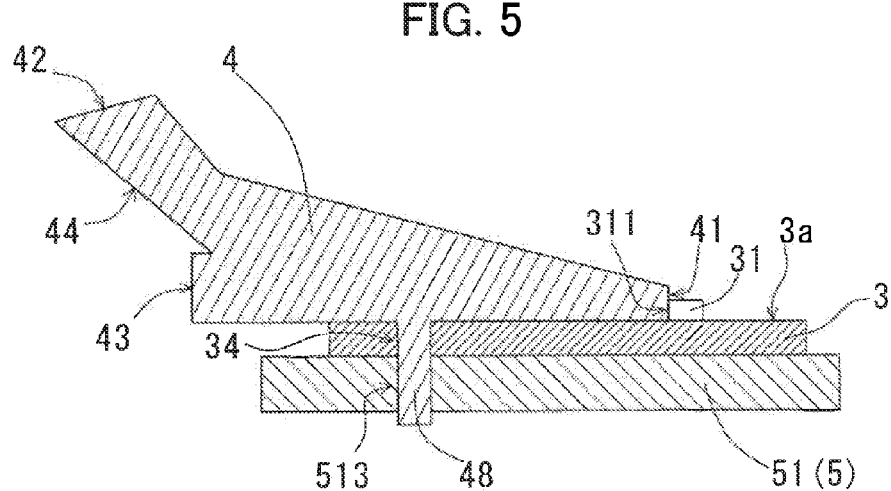
FIG. 5 is a schematic sectional view showing a mounting structure of the array substrate and the light guide member according to a second embodiment of the present invention.
Figure 6:
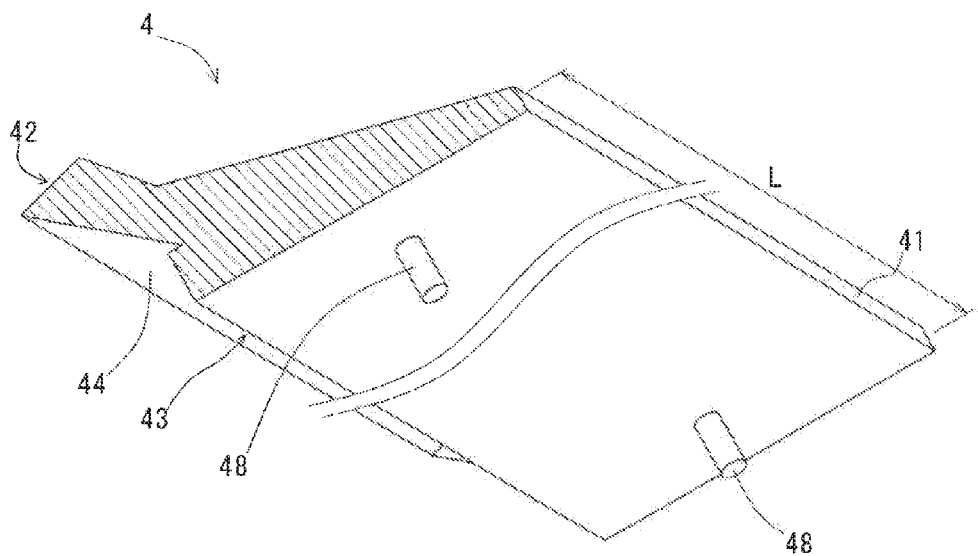
FIG. 6 is a perspective view showing a light guide member according to the second embodiment of the present invention.

Next, a second embodiment will be described. FIG. 5 is a schematic sectional view showing a mounting structure of the array substrate 3 and the light guide member 4 according to a second embodiment. FIG. 6 is a perspective view showing a light guide member 4 according to the second embodiment. The aspects of configuration that are common to the embodiment described with reference to FIG. 1 to FIG. 4 (the first embodiment) are denoted by the same reference numerals, and description will not be repeated.

In the second embodiment, the positioning portion includes a third positioning hole 34 formed in the array substrate 3, a fourth positioning hole 513 formed in the frame 51, and a second positioning pin 48 formed in the light guide member 4 and inserted and fitted into both the third positioning hole 34 and the fourth positioning hole 513.

The second positioning pin 48 (an example of a positioning portion) is integrally formed in the light guide member 4 according to the second embodiment to project from the lower surface of the light guide member 4 within the optical path region L in the main scanning direction of the light guide member 4.

A third positioning hole 34 is formed in the array substrate 3 for fitting with the second positioning pin 48 in a configuration in which the incident surface 41 of the light guide member 4 makes contact with the light emitting surface 311 of the plurality of LEDs.

The fourth positioning hole 513 is formed corresponding to and coincides with the third positioning hole 34 for fitting of the second positioning pin 48.

When the second positioning pin 48 is formed to project from the lower surface of the light guide member 4, the second positioning pin 48 is positioned on an outer side of the light path region in the subscanning direction of the light guide member 4. As used herein, the subscanning direction is the direction that is orthogonal to the direction of travel of light and the main scanning direction. The light path region of the subscanning direction of the light guide member 4 is the region shown by hatching in FIG. 6.

Thus the second positioning pin 48 does not shade the light path even when formed within the range of the optical path region L in the main scanning direction. As a result, there is no requirement to enlarge the light guide member 4, and array substrate 3 and the frame 51 to be larger than the optical path region L of the light guide member 4 in the main scanning direction. Consequently a compact configuration for constituent members, and economization of space within the apparatus is achieved.

The scanner X according to the second embodiment obtains the same effect and operation as the scanner X according to the first embodiment.

The image forming apparatus provided with the scanner X according to the second embodiment also obtains the same effect and operation as above.

Although the scanner X has been described as an example of the image reading apparatus according to the present invention, the present invention includes a configuration of an image forming apparatus such as a copying machine, facsimile, multifunction peripheral, and the like provided with an image reading apparatus such as the scanner X.

What is claimed is:

1. An image reading apparatus comprising:
an array substrate in which a plurality of point light sources is arrayed and mounted in a linear shape at a predetermined interval along the main scanning direction;
a light guide member disposed on a surface of the array substrate that mounts the plurality of point light sources, and guiding light from the plurality of point light sources to the document surface;
a frame for fixing the light guide member and the array substrate;
a positioning portion that determines the positional relationship of the frame with the light guide member and the array substrate in a configuration in which an incident surface of the light guide member is in proximity to or in contact with the plurality of point light sources; and
an image reading unit that uses reflected light when illuminating light from the plurality of point light sources through the light guide member onto the document surface to thereby read the document image,
wherein the positioning portion comprises:
a first positioning hole formed in the array substrate;
a second positioning hole formed in the light guide member; and
a first positioning pin provided on the frame, and inserted and fitted into both of the first positioning hole and the second positioning hole.

2. The image reading apparatus according to claim 1, wherein the first positioning pin, the first positioning hole and the second positioning hole respectively
are formed on an outer side of the main scanning direction respectively in the frame, the array substrate and the light guide member relative to an optical path region of the light guide member through which light from the plurality of point light sources passes.

3. The image reading apparatus according to claim 2, further comprising a fixing portion that further fixes the light guide member and the array substrate when positioned by the positioning portion.

4. An image reading apparatus comprising:
an array substrate in which a plurality of point light sources is arrayed and mounted in a linear shape at a predetermined interval along the main scanning direction;
a light guide member disposed on a surface of the array substrate that mounts the plurality of point light sources, and guiding light from the plurality of point light sources to the document surface;
a frame for fixing the light guide member and the array substrate;
a positioning portion that determines the positional relationship of the frame with the light guide member and the array substrate in a configuration in which an incident surface of the light guide member is in proximity to or in contact with the plurality of point light sources; and
an image reading unit that uses reflected light when illuminating light from the plurality of point light sources through the light guide member onto the document surface to thereby read the document image,
wherein the positioning portion comprises
a third positioning hole formed in the array substrate;
a fourth positioning hole formed in the frame; and
a second positioning pin formed on the light guide member, and inserted and fitted into both of the third positioning hole and the fourth positioning hole.

5. The image reading apparatus according to claim 4, further comprising a fixing portion that further fixes the light guide member and the array substrate when positioned by the positioning portion.

6. An image forming apparatus comprising:
an image reading apparatus, the image reading apparatus including an array substrate in which a plurality of point light sources is arrayed and mounted in a linear shape at a predetermined interval along the main scanning direction;
a light guide member disposed on a surface of the array substrate that mounts the plurality of point light sources, and guiding light from the plurality of point light sources to the document surface;
a frame for fixing the light guide member and the array substrate;
a positioning portion that determines the positional relationship of the frame with the light guide member and the array substrate in a configuration in which an incident surface of the light guide member is in proximity to or in contact with the plurality of point light sources; and
an image reading unit that uses reflected light when illuminating light onto the document surface from the plurality of point light sources through the light guide member to thereby read the document image,
wherein the positioning portion comprises:
a first positioning hole formed in the array substrate;

a second positioning hole formed in the light guide member; and a first positioning pin provided on the frame, and inserted and fitted into both of the first positioning hole and the second positioning hole.

7. The image forming apparatus according to claim 6, wherein the first positioning pin, the first positioning hole and the second positioning hole respectively are formed on an outer side of the main scanning direction respectively in the frame, the array substrate and the light guide member relative to an optical path region of the light guide member through which light from the plurality of point light sources passes.

8. The image forming apparatus according to claim 7, further comprising a fixing portion that further fixes the light guide member and the array substrate when positioned by the positioning portion.

9. An image forming apparatus comprising:

an image reading apparatus, the image reading apparatus including an array substrate in which a plurality of point light sources is arrayed and mounted in a linear shape at a redetermined interval along the main scanning direction;

a light guide member disposed on a surface of the array substrate that mounts the plurality of point light sources, and guiding light from the plurality of point light sources to the document surface;

a frame for fixing the light guide member and the array substrate;

a positioning portion that determines the positional relationship of the frame with the light guide member and the array substrate in a configuration in which an incident surface of the light guide member is in proximity to or in contact with the plurality of point light sources; and an image reading unit that uses reflected light when illuminating light onto the document surface from the plurality of point light sources through the light guide member to thereby read the document image, wherein the positioning portion comprises:

a third positioning hole formed in the array substrate;

a fourth positioning hole formed in the frame; and a second positioning pin formed on the light guide member, and inserted and fitted into both of the third positioning hole and the fourth positioning hole.

10. The image forming apparatus according to claim 9, further comprising a fixing portion that further fixes the light guide member and the array substrate when positioned by the positioning portion.

\* \* \* \* \*